United States Patent
Porras, III et al.

(10) Patent No.: US 6,830,253 B1
(45) Date of Patent: Dec. 14, 2004

(54) EQUIPMENT DOLLY

(76) Inventors: Ben Porras, III, 6114 Geenwood, Shawnee, KS (US) 66216; Shauna Porras, 6114 Greenwood, Shawnee, KS (US) 66216

( * ) Notice: Subject to any disclaimer, the term of this patent is extended or adjusted under 35 U.S.C. 154(b) by 42 days.

(21) Appl. No.: 10/347,071

(22) Filed: Jan. 17, 2003

(51) Int. Cl.$^7$ .............................................. B62B 1/14
(52) U.S. Cl. ................. 280/47.26; 280/638; 280/47.19; 280/47.35
(58) Field of Search .................... 280/47.26, 35, 280/638, 659, 814, 47.17, 47.18, 47.19, 47.24, 47.29, 47.35, 79.2, 79.3, 47.28, 47.131

(56) References Cited

U.S. PATENT DOCUMENTS

| | | | |
|---|---|---|---|
| D154,640 S | * | 7/1949 | Sasser .......................... D34/26 |
| 3,052,484 A | * | 9/1962 | Huffman et al. ............. 280/654 |
| 3,198,328 A | * | 8/1965 | Donahue, et al. ............ 206/526 |
| 3,627,344 A | * | 12/1971 | Rizzuto ...................... 280/47.2 |
| 3,697,095 A | * | 10/1972 | Howell ..................... 280/47.26 |
| 3,815,933 A | * | 6/1974 | Olson ....................... 280/47.35 |
| 3,869,137 A | | 3/1975 | Byrom |
| 3,876,223 A | | 4/1975 | O'reilly et al. |
| 4,066,156 A | | 1/1978 | Basile |
| 4,227,710 A | | 10/1980 | Laub |
| 4,998,743 A | | 3/1991 | Thielen |
| D378,456 S | | 3/1997 | Speicher |
| 5,611,561 A | * | 3/1997 | Dale, II ....................... 280/652 |
| D396,923 S | * | 8/1998 | Moore .......................... D34/24 |
| 5,797,612 A | * | 8/1998 | Buccioni ................. 280/47.26 |
| 5,865,449 A | * | 2/1999 | Castaneda .............. 280/33.996 |
| 6,047,866 A | * | 4/2000 | Brown ........................ 222/608 |
| 6,082,757 A | * | 7/2000 | Lin ............................. 280/654 |
| 6,220,610 B1 | * | 4/2001 | Cox ......................... 280/47.19 |
| 6,494,468 B1 | * | 12/2002 | Inge ......................... 280/47.35 |
| 6,543,800 B1 | * | 4/2003 | Doran ......................... 280/652 |
| 6,598,898 B2 | * | 7/2003 | Chu ........................... 280/652 |
| 6,663,119 B2 | * | 12/2003 | White ..................... 280/47.26 |
| 6,666,465 B2 | * | 12/2003 | Chan ...................... 280/47.26 |
| 2003/0042695 A1 | * | 3/2003 | White ..................... 280/47.26 |

* cited by examiner

Primary Examiner—Christopher P. Ellis
Assistant Examiner—J. Allen Shriver

(57) ABSTRACT

A equipment dolly for transporting sporting equipment to a desired location. The equipment dolly includes a frame assembly comprising a pair of stanchion members and a handle member. The handle member extends between an upper end of the stanchion members. The handle member is designed for being gripped by a hand of the user. The frame assembly is designed for receiving the sporting equipment whereby the frame assembly permits transportation of the sporting equipment by the user. Each of a plurality of wheels is rotatably coupled to one of the stanchion members. Each of the wheels is positioned opposite the handle member of the frame assembly. The wheels are designed for rolling across a support surface whereby the wheels are for facilitating transporting the frame assembly across the support surface.

6 Claims, 5 Drawing Sheets

EQUIPMENT DOLLY

BACKGROUND OF THE INVENTION

1. Field of the Invention

The present invention relates to portable storage carts and more particularly pertains to a new equipment dolly for transporting sporting equipment to a desired location.

2. Description of the Prior Art

The use of portable storage carts is known in the prior art. U.S. Pat. No. 3,869,137 describes a device for carrying various pieces of sporting equipment to a desired location. Another type of portable storage cart is U.S. Pat. No. 4,227,710 having a wheeled cart for carrying and storing baseball equipment. U.S. Pat. No. 4,998,743 has a golf cart for storing and transporting golf equipment, U.S. Pat. No. 4,227,710 has a bowling ball equipment carrier for facilitating transportation of bowling equipment. U.S. Pat. No. Des. 378,456 shows a fisherman's caddy.

SUMMARY OF THE INVENTION

An object of the present invention is to provide a new equipment dolly that facilitates transportation of sporting equipment to a desired location.

Even still another object of the present invention is to provide a new equipment dolly that provides a cover member for covering the frame assembly to limit the contact of the sporting equipment to adverse weather.

To this end, the present invention generally comprises a frame assembly comprising a pair of stanchion members and a handle member. The handle member extends between an upper end of the stanchion members. The handle member is designed for being gripped by a hand of the user. The frame assembly is designed for receiving the sporting equipment whereby the frame assembly permits transportation of the sporting equipment by the user. Each of a plurality of wheels is rotatably coupled to one of the stanchion members. Each of the wheels is positioned opposite the handle member of the frame assembly. The wheels are designed for rolling across a support surface whereby the wheels are for facilitating transporting the frame assembly across the support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
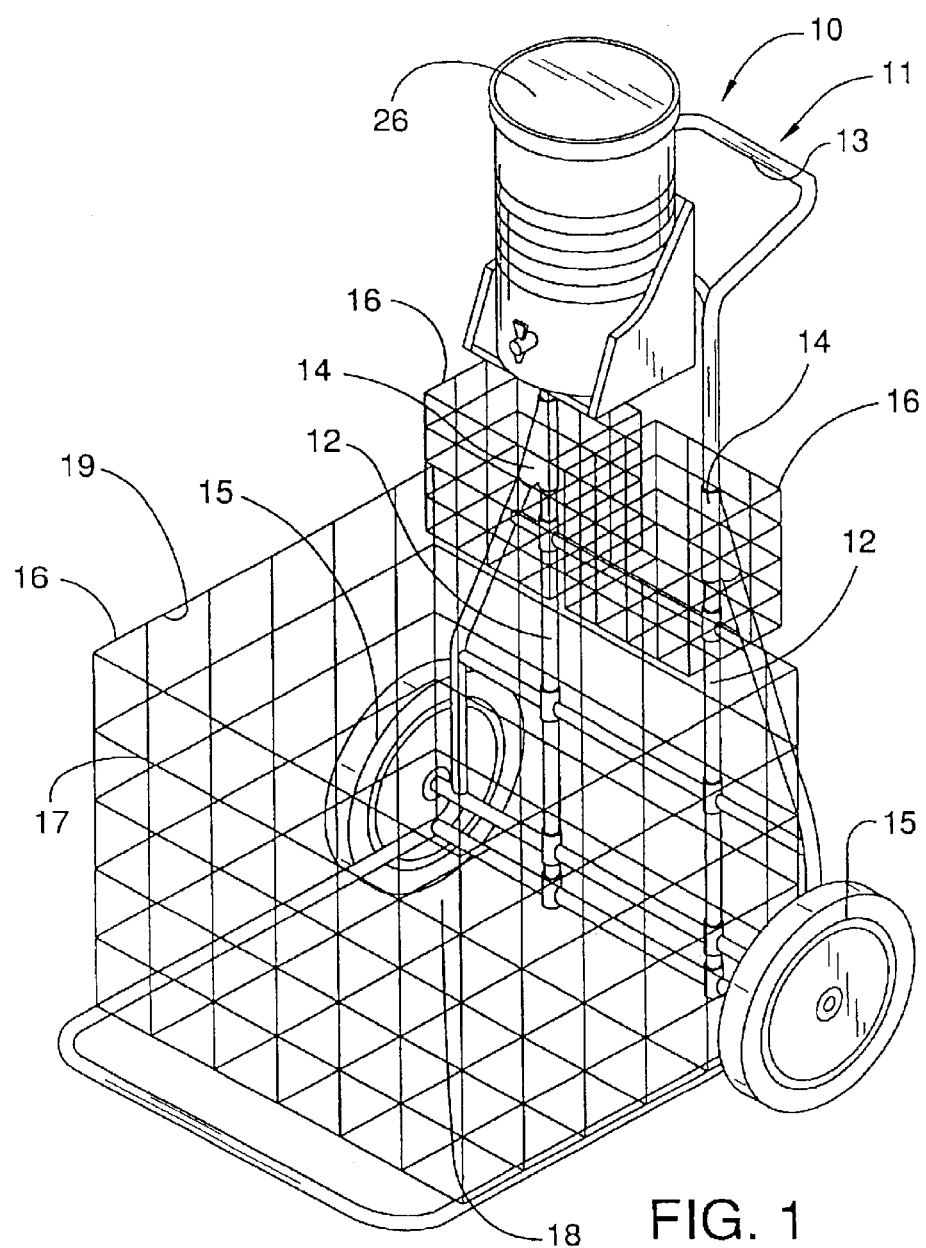
FIG. 1 is a perspective view of a new equipment dolly according to the present invention shown in use.
Figure 2:
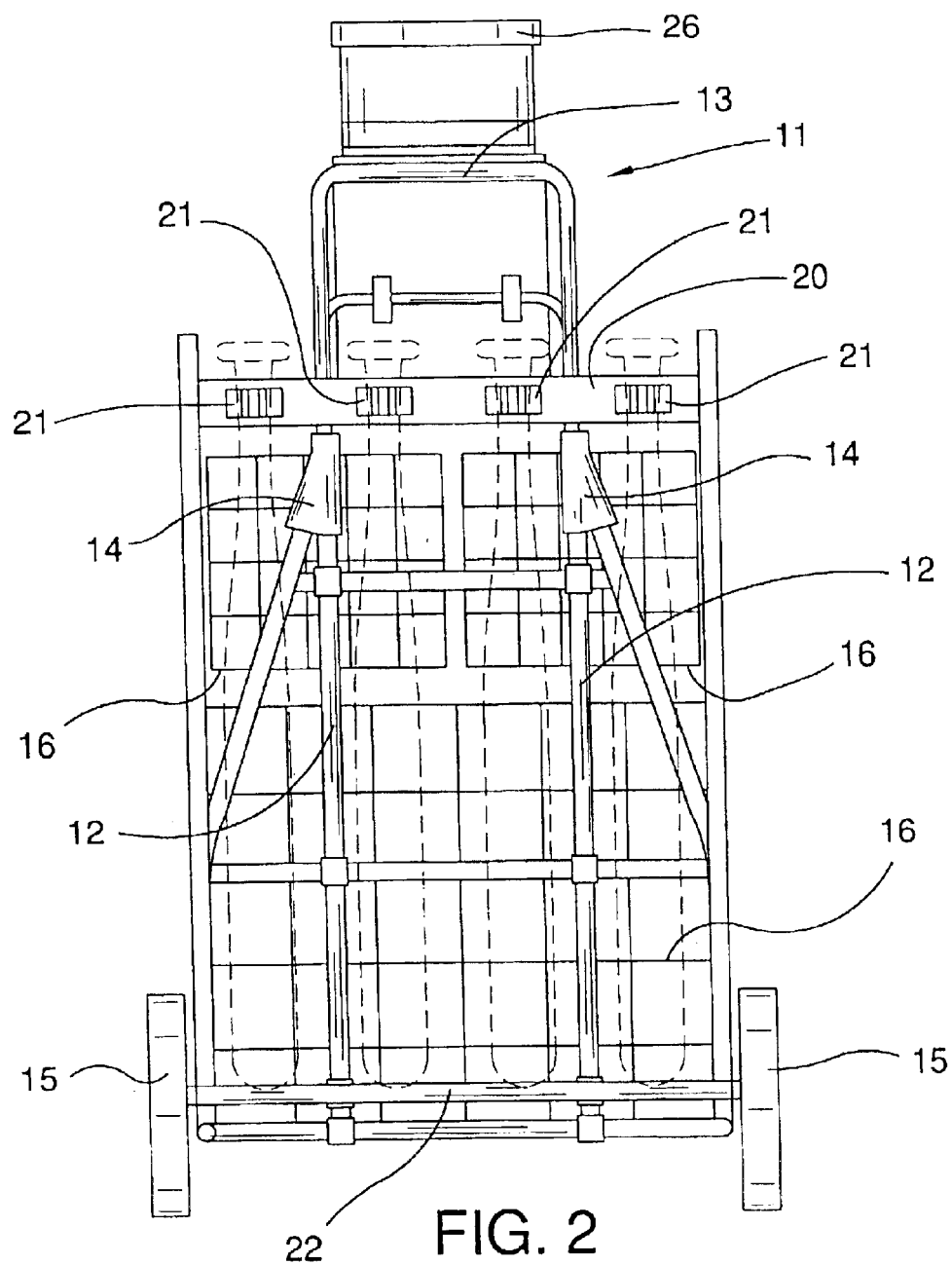
FIG. 2 is a front view of the present invention.
Figure 3:
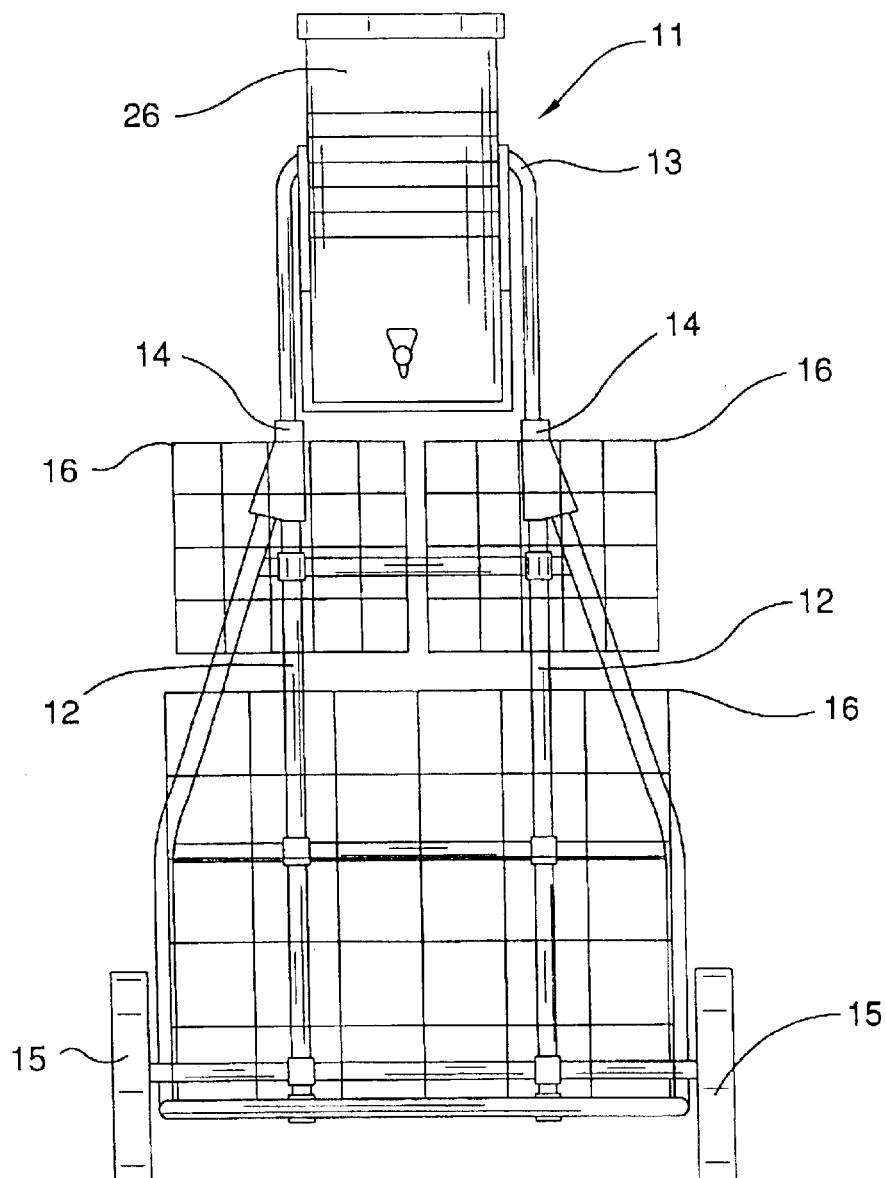
FIG. 3 is a rear view of the present invention.
Figure 4:
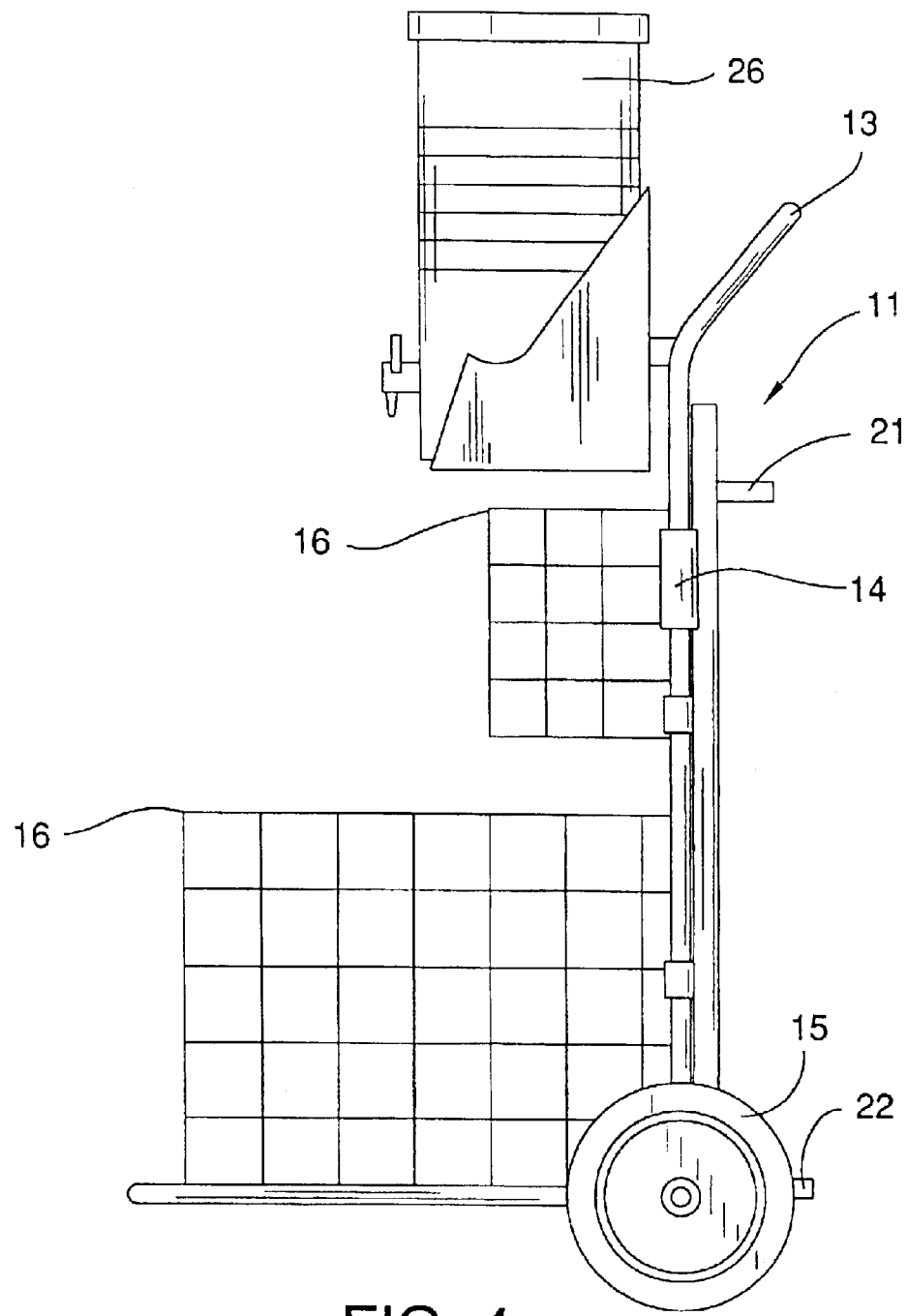
FIG. 4 is a side view of the present invention.
Figure 5:
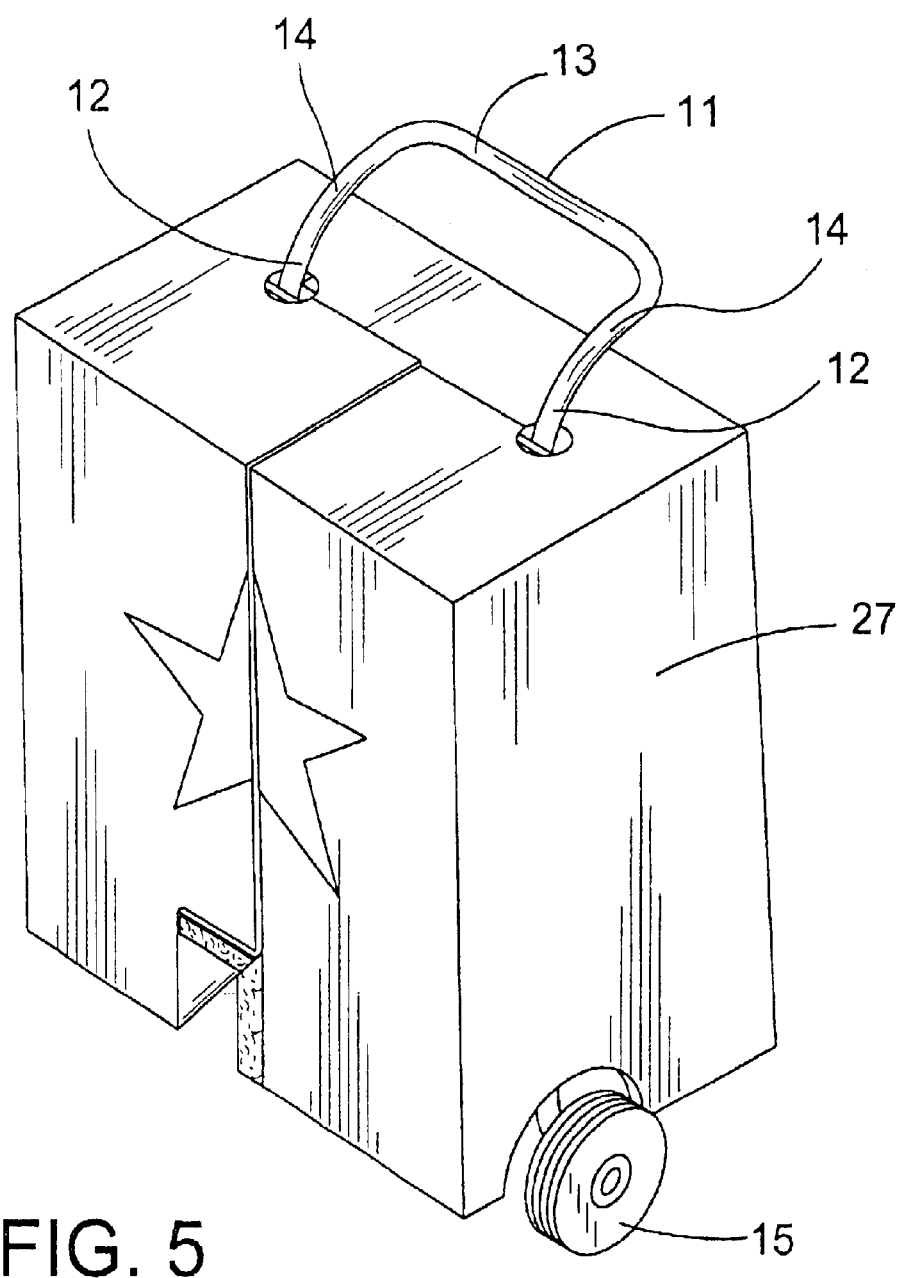
FIG. 5 is a perspective view of the cover positioned over the present invention.

With reference now to the drawings, and in particular to FIGS. 1 through 5 thereof, a new equipment dolly embodying the principles and concepts of the present invention and generally designated by the reference numeral 10 will be described.

As best illustrated in FIGS. 1 through 5, the equipment dolly 10 generally comprises a frame assembly 11 comprising a pair of stanchion members 12 and a handle member 13. The handle member 13 extends between an upper end 14 of the stanchion members 12. The handle member 13 is designed for being gripped by a hand of the user. The frame assembly 11 is designed for receiving the sporting equipment whereby the frame assembly 11 permits transportation of the sporting equipment by the user.

Each of a plurality of wheels 15 is rotatably coupled to one of the stanchion members 12. Each of the wheels 15 is positioned opposite the handle member 13 of the frame assembly 11. The wheels 15 are designed for rolling across a support surface whereby the wheels 15 are for facilitating transporting the frame assembly 11 across the support surface.

The frame assembly 11 comprises a plurality of bin members 16. Each of the bin members 16 is coupled to at least one of the stanchion members 12 of the frame assembly 11. Each of the bin members 16 is designed for receiving a portion of the sporting equipment for transportation. The frame assembly 11 is selectively collapsible to facilitate storage the frame assembly 11, such as in a trunk of the vehicle.

Each of the bin members 16 comprises a perimeter wall 17. The perimeter wall 17 defines an interior space 18 of an associated one of the bin members 16. The interior space 18 comprises an open top end 19 whereby the open top end 19 is designed for permitting the sporting equipment to be inserted into the receiving space of the associated one of the bin members 16.

The frame assembly 11 comprises a support member 20 extending between the stanchion members 12 of the frame assembly 11. The support member 20 is positioned proximate the handle member 13 of the frame assembly 11. The frame assembly 11 comprises a plurality of clip members 21 being coupled to the support member 20. Each of the clip members 21 is designed for receiving a bat whereby each of the clip members 21 secures the bat to the frame assembly 11 for transportation.

The frame assembly 11 comprises a resting plate 22. The resting plate 22 is coupled between the stanchion members 12 opposite the handle member 13. The resting plate 22 is designed for supporting an end of the bat opposite the associated one of the clip members 21 when at least one of the clip members 21 receives the bat.

The frame assembly 11 comprises a liquid member 26. The liquid member 26 is coupled to one of the stanchion members 12. The liquid member 26 is designed for holding liquid to be supplied to players using the sporting equipment transported by the frame assembly 11.

A cover member 27 is selectively coupled to the stanchion members 12 of the frame assembly 11 whereby the handle member 13 extends from the cover member 27. The cover member 27 is designed for covering the sporting equipment being transported by the frame assembly 11 to protect the sporting equipment from adverse weather.

In use, the user places the sporting gear in the bin members 16 and bats in the clip members 21. The vertical portion 25 of the bracing member 23 is extended through the ear holes of the helmets so that the helmets can be easily transported to the desired location. The liquid member 26 is then filled with liquid to be transported to the desired location to be consumed by the players.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An equipment dolly for transporting sporting equipment by a user, the equipment dolly comprising:
   a frame assembly comprising a pair of stanchion members and a handle member, said handle member extending between an upper end of said stanchion members, said handle member being adapted for being gripped by a hand of the user, said frame assembly being adapted for receiving the sporting equipment such that said frame assembly permits transportation of the sporting equipment by the user;
   each of a plurality of wheels being rotatably coupled to one of said stanchion members, each of said wheels being positioned opposite said handle member of said frame assembly, said wheels being adapted for rolling across a support surface such that said wheels are for facilitating transporting said frame assembly across the support surface;
   said frame assembly comprising a support member extending between said stanchion members of said frame assembly, said support member being positioned proximate said handle member of said frame assembly, said frame assembly comprising a plurality of clip members being coupled to said support member, each of said clip members being adapted for receiving a bat such that each of said clip members secures the bat to said frame assembly for transportation; and
   said frame assembly comprising a resting plate, said resting plate being coupled between said stanchion members opposite said handle member, said resting plate being adapted for supporting an end of the bat opposite the associated one of said clip members when at least one of said clip members receives the bat, said resting plate having a length substantially equal to a length of said support member to allow the bats secured by said clip members to be supported in a position substantially parallel to said stanchion members.

2. The equipment dolly as set forth in claim 1, further comprising:
   said frame assembly comprising a plurality of bin members, each of said bin members being coupled to at least one of said stanchion members of said frame assembly, each of said bin members being adapted for receiving a portion of the sporting equipment for transportation.

3. The equipment dolly as set forth in claim 2, further comprising:
   each of said bin members comprising a perimeter wall, said perimeter wall defining an interior space of an associated one of said bin members, said interior space comprising au open top end such that said open top end is adapted for permitting the sporting equipment to being inserted into said interior space of the associated one of said bin members.

4. The equipment dolly as set forth in claim 1, further comprising:
   said frame assembly comprising a liquid member, said liquid member being coupled to one of said stanchion members, said liquid member being adapted for holding liquid to be supplied to players using the sporting equipment transported by said frame assembly.

5. The equipment dolly as set forth in claim 1, further comprising:
   a cover member being selectively coupled to said stanchion members of said frame assembly such that said handle member extends from said cover member, said cover member being adapted for covering the sporting equipment being transported by said frame assembly to protect the sporting equipment from adverse weather.

6. An equipment dolly for transporting sporting equipment by a user, the equipment dolly comprising:
   a frame assembly comprising a pair of stanchion members and a handle member, said handle member extending between an upper end of said stanchion members, said handle member being adapted for being gripped by a hand of the user, said frame assembly being adapted for receiving the sporting equipment such that said frame assembly permits transportation of the sporting equipment by the user;
   each of a plurality of wheels being rotatably coupled to one of said stanchion members, each of said wheels being positioned opposite said handle member of said frame assembly, said wheels being adapted for rolling across a support surface such that said wheels are for facilitating transporting said frame assembly across the support surface;
   said frame assembly comprising a plurality of bin members, each of said bin members being coupled to at least one of said stanchion members of said frame assembly, each of said bin members being adapted for receiving a portion of the sporting equipment for transportation;
   each of said bin members comprising a perimeter wall, said perimeter wall defining an interior space of an associated one of said bin members, said interior space comprising an open top end such that said open top end is adapted for permitting the sporting equipment to being inserted into said interior space of the associated one of said bin members;
   said frame assembly comprising a support member extending between said stanchion members of said frame assembly, said support member being positioned proximate said handle member of said frame assembly, said frame assembly comprising a plurality of clip members being coupled to said support member, each of said clip members being adapted for receiving a bat such that each of said clip members secures the bat to said frame assembly for transportation;

said frame assembly comprising a resting plate, said resting plate being coupled between said stanchion members opposite said handle member, said resting plate being adapted for supporting an end of the bat opposite the associated one of said clip members when at least one of said clip members receives the bat, said resting plate having a length substantially equal to a length of said support member to allow the bats secured by said clip members to be supported in a position substantially parallel to said stanchion members;

said frame assembly comprising a liquid member, said liquid member being coupled to one of said stanchion members, said liquid member being adapted for holding liquid to be supplied to players using the sporting equipment transported by said frame assembly; and a cover member being selectively coupled to said stanchion members of said frame assembly such that said handle member extends from said cover member, said cover member being adapted for covering the sporting equipment being transported by said frame assembly to protect the sporting equipment from adverse weather.

\* \* \* \* \*